Figure 1:
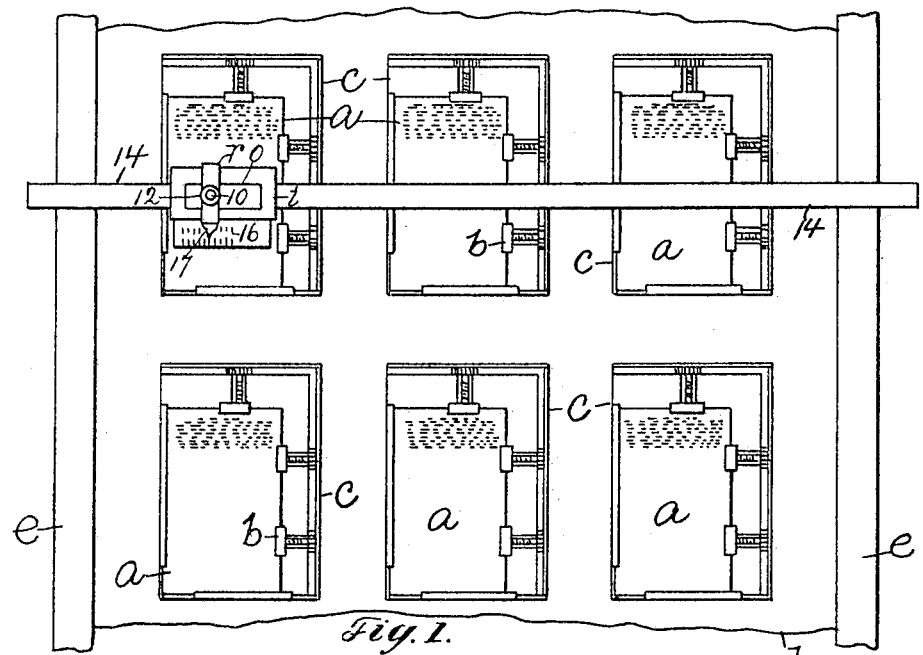

No. 798,614. PATENTED SEPT. 5, 1905.
S. W. MARVIN.
INDICATING APPARATUS.
APPLICATION FILED MAR. 30, 1905.

Witnesses.
C. H. Gannett
J. Murphy

Inventor.
Samuel W. Marvin
by Jas. H. Churchill
Atty.

UNITED STATES PATENT OFFICE.

SAMUEL W. MARVIN, OF CAMBRIDGE, MASSACHUSETTS, ASSIGNOR OF ONE-FOURTH TO CHARLES G. WELLS, OF JAMAICA PLAIN, MASSACHUSETTS, AND ONE-FOURTH TO HARRY C. WHITTEMORE, OF CAMBRIDGE, MASSACHUSETTS.

INDICATING APPARATUS.

No. 798,614. Specification of Letters Patent. Patented Sept. 5, 1905.

Application filed March 30, 1905. Serial No. 252,849.

*To all whom it may concern:*

Be it known that I, SAMUEL W. MARVIN, a citizen of the United States, residing in Cambridge, in the county of Middlesex and State of Massachusetts, have invented an Improvement in Indicating Apparatus, of which the following description, in connection with the accompanying drawings, is a specification, like characters on the drawings representing like parts.

This invention relates to an apparatus especially designed and adapted for use on printing-presses to enable a plurality of printing-plates to be accurately adjusted into printing position in the least possible time.

As now commonly practiced the printing-plates are secured to blocks which are set upon the bed of the press and a test is made by pulling a sheet of paper through the press and noting the impressions on the back of the sheet. The impressions made by some plates are more pronounced than those made by other plates, which indicates that the type of the plates are not all in proper printing position. To correct this, the operator places one or more sheets of paper under some printing-plates and removes one or more sheets from under other printing-plates and again takes an impression on another sheet of paper. The impressions are again noted, and the process of adjusting the printing-plates and testing the same is repeated until the test on the paper indicates that the type-surface of all the plates is in substantially the same plane and in correct printing position. In practice it frequently occurs that a number of adjustments of the printing-plates and tests are made before a satisfactory impression is obtained.

The present invention has for its object to provide apparatus by means of which the position of the type-surface of the printing-plates with relation to the proper printing-level may be made known, so that the said printing-plates may be properly positioned with their surfaces in the proper or desired printing-plane in a substantially short time. To this end I employ an apparatus provided with a member having a position which is determined by the proper printing-level, a second member which is positioned with respect to the first-mentioned member by the printing-plates, and a gage or indicating device by which the distance between the surface of the printing-plates and the proper printing-level is made known or indicated. These and other features of this invention will be pointed out in the claims at the end of this specification.

Figures 2, 4:
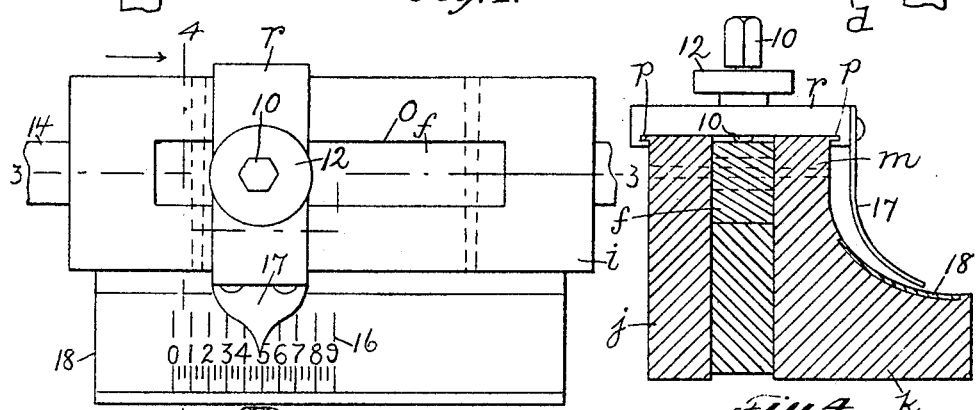
Figures 3, 5:
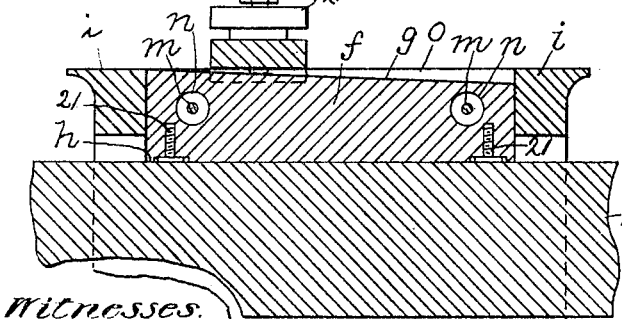

Figure 1 is a plan view of a sufficient portion of a printing-press provided with a testing apparatus embodying this invention to enable it to be understood; Fig. 2, a plan view, on an enlarged scale, of the testing apparatus shown in Fig. 1; Fig. 3, a longitudinal section on the line 3 3, Fig. 2; Fig. 4, a cross-section on the line 4 4, Fig. 2; and Fig. 5, a detail to be referred to.

Referring to Fig. 1, the printing-plates *a*, detachably secured by clamp *b* on the upper surface of blocks *c*, which are arranged upon the bed *d* of a printing-press, are and may be of any suitable or usual construction. The bed *d* is provided with side bars or bearers *e*, which support the impression-cylinder (not herein shown, as it constitutes no part of the present invention and is not necessary for a full understanding of the same.)

It is desirable that the type-surface of the printing-plates *a* should be in the same horizontal plane in order to obtain the best results, and owing to variations in the thickness of the printing-plates *a* and of the blocks *c* adjustment of the printing-plates is necessary, and this adjustment is effected as now commonly practiced by placing under the printing-plates one or more sheets of paper of substantially the size of said plates, the number of sheets of paper required to bring the type-surface of the printing-plates into the proper printing plane or position being determined as now commonly practiced by making a series of adjustments and taking a number of impressions as above set forth. The present invention has for its object to provide apparatus for accurately determining the distance each printing-plate is above or below the proper or desired printing plane or level, whereby the operator may be informed of the number of sheets of paper required to be placed under each printing-plate. In the present instance I have herein shown one form of apparatus for accomplishing this result and which form I may prefer; but I do not desire to limit my invention to the particular construction shown. The apparatus referred to consists of one member whose position is determined by a known level, which is preferably the printing-level, a movable member whose position is determined by the surfaces of the printing-plates, and a gage or indicating device coöperating with both members to indicate the difference in distance between the printing-surfaces of the plates and the proper printing-level. The first member referred to may be designated the "stationary" member and the second member the "movable" member of the apparatus. The stationary member in the present instance consists of a bar $f$, provided with an inclined upper surface $g$ and with a straight lower surface $h$. The movable member may be made in one piece and consists of a top piece $i$ and depending legs or side bars $j$ $k$, which are separated from each other to form a longitudinally-extended slot, in which is located the stationary member $f$, which is connected with the movable member, as shown, by pins $m$, extended through the side bars $j$ $k$ and through enlarged openings $n$ in the member $f$, (see Fig. 3,) whereby said members are movable with relation to each other.

The top piece $i$ is provided with a longitudinally-extended opening $o$, which communicates with the slot between the side bars and is made of sufficient length to permit the bar or member $f$ to enter it. (See Fig. 3.) The top piece $i$ is provided, as shown, with side flanges or lips $p$, which form guides for an indicating device or gage, herein shown as a sliding block $r$, which moves over the movable member and is provided with an adjusting-screw 10, which extends down through it in line with the opening $o$ and coöperates with the stationary member $f$, as will be described. The adjusting-screw 10 has mounted on it a set-nut 12, which engages the gage-block and locks the screw 10 in its adjusted position. The movable member of the apparatus or device is fitted over a supporting-bar 14, having a straight upper surface upon which the member $f$ can slide. The supporting-bar 14 is preferably made long enough to extend across the bed of the press and rest upon the bearers $e$, as shown in Fig. 1.

In operation the printing-blocks $c$ are arranged on the bed in the desired manner, and the supporting-bar 14 is extended across the bed above one row of printing-plates, as represented in Fig. 1. The testing device is then placed over the supporting-bar with the member $f$ resting thereon, as represented in Fig. 3. The movable member moves down until its lower surface rests on the type of the first or left-hand printing-plate of the first row, as shown in Fig. 1. This movement of the movable member causes the inclined upper surface of the bar or stationary member to assume such a position with relation to the upper surface of the movable member as to offer an obstruction to the movement of the slide-bar $r$ over the upper surface of said movable member. The point at which the slide-bar is arrested is indicated by a scale 16, made on or carried by the movable member, with which scale a pointer 17 on the slide-bar coöperates. The scale may be made on the side bar $k$ of the movable member or it may be made on a card 18, which is slipped into a suitable guideway in the side bar $k$, which latter may be curved on its upper surface so that the scale may be applied thereto in such manner as to enable it to be read by the operator looking down upon it. The number or graduation on the scale with which the pointer or index coöperates indicates the distance the type-surface is below the desired or printing level, which in the present instance is the upper surface of the bearers $e$. As represented in Fig. 2, the pointer 17 registers with the graduation marked "5" on the scale, which indicates to the operator that five sheets of paper of a predetermined thickness are required to be placed under the printing-plate of the left-hand block of the first row. The operator may place the required number of sheets under the printing-plate before proceeding to test the next plate in the upper row; but to save time he may put down the number "5" on a piece of paper and proceed to test the other printing-plates. After the first plate in the upper row has been tested the device is moved along the bar 14 over the second plate of the top row and the slide-bar $r$ moved until arrested by the stationary member $f$. Let it be supposed that the pointer 17 in this case registers with the number "2" on the scale. This would indicate to the operator that two sheets are required for the second plate of the top row, and he notes this number on his paper. The apparatus is then moved along the bar 14 and over the third plate. Let it be supposed that the pointer in this case registers with "4" of the scale. The operator notes this number on his paper. The bar 14 is then moved down, so as to position it with relation to the second row of plates, which are then tested, as above described, with relation to the first row.

After all of the printing-plates have been tested the operator places under each printing-plate the number of sheets required to raise the type-surface of said plate into the printing-plane, according to the numbers on his test or record sheet. When the printing-plates have been properly positioned, they may be again tested, and in this case the pointer should in each case register with the "0" graduation on the scale. If in testing any plate it should be found that the pointer passes beyond the "0" graduation, it serves to indicate to the operator that the type-surface of the printing-plate is too high, in which case the printing-plate should be removed and a sufficient amount taken off of the back.

The scale may be provided with substantially coarse graduations indicated by the numbers "0" to "9," and also finer graduations indicated by the short lines between the numerals. The numbers indicate one thickness of paper and the short lines indicate a thinner paper—such, for instance, as tissue-paper.

The stationary member may and preferably will be provided on its under side with adjusting-screws 21, by means of which the said member may be raised above the supporting-bar, as represented in Fig. 5, and by turning one screw more than the other the inclination of the upper surface of the stationary member may be varied or adjusted with relation to the top surface of the movable member, so that the slide block or gage may be used with the same scale when the thickness of the paper employed as a standard is changed.

I claim—

1. In an apparatus for determining the distance between surfaces at different levels, in combination, a stationary member, a movable member having an opening in its upper surface through which said stationary member is adapted to project, and a slide-bar movable on said movable member and extended over said opening therein to engage said stationary member and be arrested in its movement thereby, for the purpose specified.

2. In an apparatus for determining the distance between surfaces at different levels, in combination, a member having a position which is substantially parallel with and is determined by one of said surfaces, a second member which is positioned with respect to the first-mentioned member by the other of said surfaces and is substantially parallel with said other surface, and an indicating device separate from said members and coöperating with both to indicate the difference in levels of said surfaces.

3. In an apparatus for determining the distance between surfaces at different levels, in combination, a member located above one of said surfaces and having its position determined by said surface, means to support said member above said surface and a second member located above the other of said surfaces and having its position determined by the second surface, said members being connected together to permit of movement of one with relation to the other.

4. In an apparatus for determining the distance between surfaces at different levels, in combination, a member located above one of said surfaces and having its position determined by said surface, means to support said member above said surface and a second member located above the other of said surfaces and having its position determined by the second surface, said members being connected together to permit of movement of one with relation to the other, and means to adjust one member with relation to the other member to effect an inclination of one surface of one member with relation to a surface of the other member, for the purpose specified.

5. In an apparatus for determining the distance between surfaces at different levels, in combination, a member having its position determined by one of said surfaces and provided with an incline, means to support said member above said surface and a second member which is positioned with respect to the first-mentioned member by the other of said surfaces and provided with means coöperating with the incline on the first-mentioned member to indicate the difference in levels of said surfaces, for the purpose specified.

6. In an apparatus for determining the distance between surfaces at different levels, in combination, a member having its position determined by one of said surfaces and provided with an incline, means to support said member above said surface, and a second member which is positioned with respect to the first-mentioned member by the other of said surfaces and provided with means coöperating with the incline on the first-mentioned member to indicate the difference in levels of said surfaces, and means to adjust one of said members with relation to the other, for the purpose specified.

7. In an apparatus for determining the distance between surfaces at different levels, in combination, a stationary member provided with an inclined upper surface, a movable member having side bars between which said stationary member is interposed and provided with an opening in its upper surface into which said stationary member is adapted to enter, and a slide-bar movable over the surface of said movable member and coöperating with the inclined surface of the stationary member, substantially as described.

8. The combination with the bed of a printing-press and a printing-plate supported thereon, of a device for indicating the distance between the surface of the printing-plate and said bed consisting of a member which has a fixed or stationary position with relation to said bed, means to support said member in said fixed position and a second member which engages the printing-plate and is movable with relation to the fixed or stationary member, substantially as described.

9. The combination with the bed of a printing-press and a printing-plate supported thereon, of a device for indicating the distance between the surface of the printing-plate and said bed consisting of two members, means resting on said bed for supporting one of said members in a fixed position with relation to said bed, and means to permit of movement of the other of said members with relation to the fixed member and into engagement with said printing-plate, substantially as described.

10. The combination with the bed of a printing-press having bearers and a printing-plate supported on said bed, of a cross-bar extended across said bed and resting on said bearers, and a device for indicating the distance between the surface of said bearers and the surface of said printing-plate, said device having one member supported by said cross-bar, and another member movable with relation to the first-mentioned member and adapted to engage the surface of said printing-plate, substantially as described.

11. The combination with a printing-plate and a support whose upper surface is in a different plane from the surface of the printing-plate, of a device for indicating the distance between said surfaces comprising one member sustained above the printing-plate by said support, and a second member movable with relation to the first-mentioned member and positioned with relation to the first-mentioned member by the surface of said printing-plate.

12. In an apparatus for determining the distance between surfaces at different levels, in combination, a stationary member having an inclined upper surface, a movable member having an opening in its upper surface through which said stationary member is adapted to project and provided with graduations forming a scale, and a slide-bar movable on said movable member and extended over said opening therein to engage the inclined surface of said stationary member and be arrested in its movement thereby, and a pointer or index carried by said slide-bar and coöperating with said scale, substantially as described.

In testimony whereof I have signed my name to this specification in the presence of two subscribing witnesses.

SAMUEL W. MARVIN.

Witnesses:
    JAS. H. CHURCHILL,
    J. MURPHY.